Patented Jan. 9, 1951

2,537,516

UNITED STATES PATENT OFFICE 2,537,516

PROCESS OF PRODUCING HYDROGEN PEROXIDE BY THE ALTERNATE REDUCTION AND OXIDATION OF ALKYLATED ANTHRAQUINONES

Lynn H. Dawsey, Carl K. Muehlhausser, and Robert R. Umhoefer, Kenmore, N. Y., assignors to Buffalo Electro-Chemical Company, Inc., Tonawanda, N. Y.

No Drawing. Application March 9, 1950, Serial No. 148,731

9 Claims. (Cl. 23—207)

The present invention relates to the production of hydrogen peroxide by cyclic hydrogenation and oxidation of alkylated anthraquinones in an improved solvent medium.

It has been proposed to produce hydrogen peroxide from hydrogen and oxygen gases through alternate oxidation and reduction of alkylated anthraquinones dissolved in organic solution. The production of the hydrogen peroxide by this process proceeded in two main stages: (1) the hydrogenation stage where the alkylated quinone was reduced to the alkylated hydroquinone and (2) the oxidation stage where the alkylated hydroquinone was oxidized to the quinone, hydrogen peroxide splitting off during this operation. After separation of the hydrogen peroxide and the purification of the solution, the cycle of the two stages was repeated. This type of procedure has been described in U. S. Patent 2,215,883 and its commercial application in PB Report 395.

In this prior method of manufacture, a mixed solvent of two constituents was suggested for the reaction consisting of a constituent capable of dissolve the quinone form of the work material and a constituent capable of dissolving the hydroquinone form of the working material. The practical result achieved was that the working material in the solution could be ultimately oxidized and reduced in cyclic fashion in single phase without separation of either form of the working material which are solids at the temperature conditions of the process. The quinone solvent normally employed has been a hydrocarbon, usually benzene. Hydrocarbons, however, have practically zero dissolving power for the hydroquinone form of the working compound. The solvent for the hydroquinone form of the working compound consisted of the higher alcohols. However, the solubility of the hydroquinones in the higher alcohols is not very great and this limits the amount of hydroquinone that can be treated or worked per cycle which, in turn, limits the amount of hydrogen peroxide that can be produced per cycle. General experience in commercial operation of the prior process, as outlined in the literature cited above, indicates that about 10% of dissolved compound may be successfully worked with the realization of hydrogen peroxide concentrations of about 5.5 grams per liter in the organic solution, after the oxidation phase of the cycle.

Furthermore, due to the fact that the hydrogen peroxide was recovered by aqueous extraction of the mixed solvent, a continuous and relatively high mechanical loss of the hydroquinone solvent in the mixture was experienced due to the slight solubility of the higher alcohols in water.

It is an object of the present invention to provide an improved mixed solvent medium for use in the production of hydrogen peroxide by auto-oxidation of alkylated anthrahydroquinones.

It is also an object of the invention to provide an improved solvent medium for such auto-oxidation process having a greater solvent power for the hydroquinone constituent and, as an ancillary object, to improve the amount of hydrogen peroxide produced per operating cycle.

It is also an object of the invention to provide an improved solvent medium for use in the production of hydrogen peroxide by auto-oxidation process wherein the mechanical loss of the solvent is reduced during the aqueous extraction phase of the process.

It is also an object of the invention to provide a solvent medium which may be worked at high concentrations of both the quinone and hydroquinone form of the working compound.

In accordance with the principles of the present invention, an improved mixed solvent medium is provided in which to effect the cyclic hydrogenation of an alkylated anthraquinone with subsequent oxidation of the alkylated anthrahydroquinone, which medium consists of the usual hydrocarbon for solution of the quinone material and a water insoluble organic phosphonate for dissolving the anthrahydroquinone. The organic phosphonates provide excellent solvents for this purpose and as a constituent of the solvent mixture by reason of their high dissolving power for anthrahydroquinones, by reason of their chemical stability under the conditions encountered in the hydrogenation and oxidation stages of the process, and by reason of their practical insolubility in water, whereby there is substantially no mechanical loss encountered during the aqueous extraction step wherein hydrogen peroxide is removed from the mixed solvent.

The phosphonate solvents of this invention are esters and have the general formula:

where the organic radicals R, R' and R'' may be identical or different groups. The R substituent may be of alkyl, alkenyl, aryl, arylalkyl, or arylalkenyl nature. The R' and R'' substituents may be of alkyl or aryl nature and contain at least 3 carbon atoms. A large number of such compounds are possible; however, those containing only ester groups of low molecular weight are not preferred because of their slightly higher solubility in water, and consequently greater difficulty in extracting the hydrogen peroxide from their solutions. The preferred phosphonates are oily liquids substantially insoluble in water which contain at least a total of nine carbon atoms.

Examples of esters useful in our invention are dioctyl-styryl-phosphonate, dioctyl-1-octenyl-phosphonate, diphenylphenyl-phosphonate and dicresylphenyl-phosphonate, which are non-volatile compounds chemically stable toward light and heat and are fire-retardant when mixed with other materials.

Since these phosphonate esters are non-volatile, non-flammable, and possess high specific solubility for hydroquinones at the same time, great advantage is afforded in employing them as the hydroquinone solvent in the known anthraquinone processes for production of hydrogen peroxide. When the phosphonates are combined with a suitable quinone solvent, as illustrated herein in Example III, even greater economic advantage results because it then becomes possible to operate the over-all process with cheap air as one of the raw materials in place of the hitherto used expensive oxygen.

Although the phosphonates cited in this invention are discussed mainly in connection with preparation of work solutions of 2-ethylanthraquinone, we have also found them to be excellent solvents for a number of other related anthrahydroquinones. The phosphonates are applicable in the making up of work solutions in which intermediates like methylanthraquinone, tetrahydro-2-ethylanthraquinone, and the like, are substituted in place of 2-ethylanthraquinone as the working compound. The latter is the preferred working compound, in part due to its better solubility and availability.

The following specific examples are purely illustrative of the invention and are not to be deemed limitative thereof, as it will be understood that there are many variations possible within the scope of the invention, as outlined herein.

*Example I*

130 g. of 2-ethylanthraquinone was dissolved in a mixture of 360 ml. of dioctylstyryl-phosphonate, and 540 ml. of benzene to produce a solution nearly saturated with quinone, at room temperature, at a concentration of 172 g. per liter and having a specific gravity of 0.955. The solution was purified by washing with aqueous 10% sodium hydroxide, drying with anhydrous potassium carbonate and then passing it through a bed of diatomaceous earth. The so purified solution was hydrogenated in a 3-liter capacity glass flask by the introduction of 6 g. porous nickel catalyst (Raney) into the solution, replacing the air in the flask with hydrogen and agitating. After the lapse of 54 minutes, the solution had absorbed 9.8 liters of hydrogen gas, measured in a wet meter at 25° C. and 745 mm. Hg pressure, after which the agitation was stopped. The reduced solution and suspended catalyst were run through a fritted-glass filter, under nitrogen atmosphere, where the catalyst was removed. The solution was then passed into the oxidation vessel which was also under nitrogen atmosphere. The oxidation vessel was flushed with air and the solution oxidized by stirring at room temperature and oxidizing with air. After 53 minutes, 9.4 liters of oxygen measured in a wet meter at 25° C. and 745 mm. Hg pressure had been absorbed. The hydrogen peroxide was extracted 6 times with 50 cc. portions of water until 12.2 g. or 94% of the theoretical yield based on the hydrogen uptake, was recovered. The concentration of hydrogen peroxide produced in the work solution before extraction, therefore, amounted to 11.7 g. per liter as compared to 5.5 g. per liter produceable from the hitherto employed benzene-alcohol work solutions.

*Example II*

110 g. of 2-ethylanthraquinone was dissolved in a mixture of 275 ml. of dioctyloctenyl-phosphonate and 413 ml. of benzene to produce a solution saturated with quinone at 27° C. at a concentration of 141 g. per liter and with a specific gravity of 0.923. The solution was hydrogenated at room temperature for 54 minutes with 6 g. of porous nickel until 5.9 liters of hydrogen, measured at 23° C. and 746 mm. Hg pressure was absorbed. After filtering, the solution was oxidized for 53 minutes, in an air atmosphere with a consumption of 5.8 liters of oxygen. Extraction with water yielded 7.8 g. of hydrogen peroxide, or 99% of the theoretical, based upon the hydrogen consumption. The concentration of the peroxide produced in this work solution before extraction amounted to 10.0 g. per liter, as compared with 5.5 g. per liter produceable in a benzene-alcohol solution under similar conditions.

The unsaturated bond, in the alkenyl group in the dioctyloctenyl-phosphonate of the above example, appears to have been unaffected since practically all of the hydrogen consumed was converted into hydrogen peroxide.

*Example III*

110 g. of 2-ethylanthraquinone was dissolved in 275 ml. of dicresylphenyl-phosphonate and 275 ml. of commercial redistilled dimethyl naphthalene to produce a solution having a specific gravity of 1.105 and a quinone concentration of 172 g. per liter. Hydrogenation with 6 g. of porous nickel proceeded at 35° C. for 140 minutes until 5.8 liters of hydrogen, measured at 20° C. and 755 mm. Hg in a wet meter, had been absorbed. After filtering, the solution was oxidized for 34 minutes by stirring in an essentially pure oxygen atmosphere until 5.6 liters of oxygen were absorbed. Since all the components of this work solution were non-volatile, the possibility of forming explosive gas mixtures with pure oxygen was extremely small at room temperatures. Water extractions of 3 successive 100 cc. portions removed a total of 7.6 g. of hydrogen peroxide to give a 96% recovery, based upon the hydrogen consumption. The hydrogen peroxide concentration in the work solution before extraction was 11.9 g. per liter or 116% greater than the production capacity heretofore possible from benzene-alcohol work solutions under similar operating conditions. The work solution of this example is an illustration of a permanent type of composition, non-volatile, non-oxidizable with either air or oxygen gas, insoluble in water during extraction, and is non-hazardous.

All of the foregoing examples show the important saving which may be made by employing the phosphonate solvents in the anthraquinone proccesses for the production of hydrogen peroxide.

The working materials employed in the process are the conventional quinone compounds recommended heretofore, namely, anthraquinone, tetrahydroanthraquinone and alkylated derivatives of anthraquinone and tetrahydroanthraquinone, where the alkyl groups may be methyl, ethyl, propyl or isopropyl.

From the foregoing, it will be seen that the present invention provides a new class of solvents which permits of extensive improvements in the auto-oxidation process for production of hydrogen peroxide through anthraquinones.

What is claimed is:

1. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent a disubstituted organic ester of a phosphonic acid.

2. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent a dialkyl substituted ester of a phosphonic acid.

3. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent a diaryl substituted ester of a phosphonic acid.

4. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent an alkyl-aryl-disubstituted ester of a phosphonic acid.

5. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent a dioctyl styryl phosphonate.

6. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvents dioctyl octenyl phosphonate.

7. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent dicresyl phenyl phosphonate.

8. In the process for making hydrogen peroxide by reduction and oxidation of alkylated anthraquinones dissolved in a mixed solvent including a constituent for dissolving the quinone form of the working material and a constituent for dissolving the hydroquinone form of the working material, the improvement which comprises employing as a constituent of such solvent a disubstituted organic ester of a phosphonic acid having at least a total of nine carbon atoms in the phosphonate molecule.

9. In the process for making hydrogen peroxide by reduction and oxidation of alkylated anthraquinones dissolved in a mixed solvent including a constituent for dissolving the hydroquinone form of the working material, the improvement which comprises employing as a constituent of such solvent a phosphonate of the formula $RPO(OR)_2$ where R is selected from the class of radicals consisting of alkyl, alkenyl, aryl, arylalkyl and arylalkenyl.

LYNN H. DAWSEY.
CARL K. MUEHLHAUSSER.
ROBERT R. UMHOEFER.

No references cited.